United States Patent
Kantner et al.

(10) Patent No.: US 11,572,001 B1
(45) Date of Patent: Feb. 7, 2023

(54) QUICK RELEASE HEADREST REMOVAL ASSEMBLY

(71) Applicant: B/E Aerospace, Inc., Winston-Salem, NC (US)

(72) Inventors: Benjamin S. Kantner, Kernersville, NC (US); Bobby W. Lawson, Walnut Cove, NC (US); Jackson R Wanner, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/537,949

(22) Filed: Nov. 30, 2021

(51) Int. Cl.
| | |
|---|---|
| *A47C 7/36* | (2006.01) |
| *A47C 1/10* | (2006.01) |
| *B60N 2/882* | (2018.01) |
| *B60N 2/874* | (2018.01) |
| *B60N 2/829* | (2018.01) |
| *B60N 2/815* | (2018.01) |

(52) U.S. Cl.
CPC ............. *B60N 2/882* (2018.02); *B60N 2/815* (2018.02); *B60N 2/829* (2018.02); *B60N 2/874* (2018.02)

(58) Field of Classification Search
CPC .......... B60N 2/812; B60N 2/882; B60N 2/80; B60N 2/829; B60N 2/874
See application file for complete search history.

(56) References Cited

U.S. PATENT DOCUMENTS

| | | | | |
|---|---|---|---|---|
| 5,967,613 | A | * 10/1999 | McKeever | A61G 5/12 297/406 |
| 8,366,199 | B2 | 2/2013 | Reel et al. | |
| 8,585,146 | B1 | * 11/2013 | Giasson | B64D 11/0643 297/344.21 |
| 9,308,998 | B1 | 4/2016 | Pacheco et al. | |
| 10,315,773 | B1 | * 6/2019 | Ahad | B64D 11/0638 |
| 10,336,230 | B2 | 7/2019 | Novin | |
| 2004/0007910 | A1 | * 1/2004 | Skelly | B64D 11/06 297/284.3 |

FOREIGN PATENT DOCUMENTS

| | | |
|---|---|---|
| CN | 207481725 U | 6/2018 |
| CN | 109763699 A | 5/2019 |
| CN | 211892945 U | 11/2020 |
| EP | 2343424 B1 | 10/2018 |
| JP | 1997224775 A | 9/1997 |

* cited by examiner

*Primary Examiner* — Shin H Kim
(74) *Attorney, Agent, or Firm* — Suiter Swantz pc llo (57) ABSTRACT

A headrest removal assembly is disclosed. The assembly may include a plunger including a plunger shaft and lever portion. The assembly may include a compressible spring coupled to the plunger and configured to surround at least a portion of the plunger shaft. The plunger configured to translate the stopper between at least a first position and a second position when a force is applied to the lever portion of the plunger to cause the plunger to compress a portion of the compressible spring within the cavity of the base to cause the stopper to disengage from the cavity within the headrest support plate to cause the headrest removal assembly to disengage from the headrest support plate.

15 Claims, 13 Drawing Sheets

QUICK RELEASE HEADREST REMOVAL ASSEMBLY

BACKGROUND

Seats may include headrest assemblies including one or more headrest components. The headrest assembly and/or one or more components of the headrest assembly may need to be accessed after the headrest assembly is installed on the seat.

SUMMARY

A headrest assembly is disclosed, in accordance with one or more embodiments of the present disclosure. The assembly includes a headrest support plate. The assembly includes a headrest slide sub-assembly configured to couple to one or more portions of the headrest support plate, the headrest slide sub-assembly configured to translate the headrest support plate between at least a first headrest position and a second headrest position. The assembly includes a base configured to couple the headrest assembly to a portion of a seatback of a seat, the base including a cavity defined by one or more walls of the base. The assembly includes a headrest removal sub-assembly. The headrest removal sub-assembly includes a plunger including a plunger shaft, the plunger shaft including a first end and a second end, the plunger including a lever portion positioned between the first end and the second end, the cavity configured to house at least a portion of the plunger shaft. The headrest removal sub-assembly includes a compressible spring coupled to the second end of the plunger and configured to surround at least a portion of the plunger shaft, the cavity configured to house at least a portion of the compressible spring. The headrest removal sub-assembly includes a stopper configured to couple to the first end of the plunger, the stopper configured to engage with a cavity within the headrest support plate. The plunger configured to translate the stopper between at least a first stopper position and a second stopper position when a force is applied to the lever portion of the plunger to cause the plunger to compress a portion of the compressible spring within the cavity of the base to cause the stopper to disengage from the cavity within the headrest support plate to cause the headrest removal sub-assembly to disengage from the headrest support plate.

In some embodiments, the headrest removal sub-assembly may further include a bearing positioned proximate to the first end of the plunger, at least a portion of the plunger shaft configured to translate within an opening in the bearing.

In some embodiments, the first stopper position of the stopper may include an engaged position and the second stopper position of the stopper may include a disengaged position.

In some embodiments, the assembly may further include a headrest cushion configured to at least substantially conform to the headrest support plate, the headrest cushion configured to attach to at least a portion of the headrest support plate and a headrest dress cover configured to fit over at least a portion of the headrest cushion.

In some embodiments, the first headrest position of the headrest support plate may include a stowed position.

In some embodiments, the second headrest position of the headrest support plate may include a deployed position.

In some embodiments, the headrest slide sub-assembly may include a rail and carriage sub-assembly.

In some embodiments, the rail and carriage sub-assembly may include one or more linear rails configured to couple to one or more portions of the headrest support plate and a carriage slider configured to be axially displaceable within a channel of the one or more linear rails.

In some embodiments, the base may further include a u-shaped slot positioned proximate to the cavity of the base, the u-shaped slot configured to at least partially surround a portion of the lever portion of the plunger.

A headrest removal assembly is disclosed, in accordance with one or more embodiments of the present disclosure. The assembly includes a plunger including a plunger shaft, the plunger shaft including a first end and a second end, the plunger including a lever portion positioned between the first end and the second end, the cavity configured to house at least a portion of the plunger shaft. The assembly includes a compressible spring coupled to the second end of the plunger and configured to surround at least a portion of the plunger shaft, a cavity within a base configured to house at least a portion of the compressible spring. The assembly includes a stopper configured to couple to the first end of the plunger, the stopper configured to engage with a cavity within a headrest support plate. The plunger configured to translate the stopper between at least a first stopper position and a second stopper position when a force is applied to the lever portion of the plunger to cause the plunger to compress a portion of the compressible spring within the cavity of the base to cause the stopper to disengage from the cavity within the headrest support plate to cause the headrest removal sub-assembly to disengage from the headrest support plate.

In some embodiments, the headrest removal sub-assembly may further include a bearing positioned proximate to the first end of the plunger, at least a portion of the plunger shaft configured to translate within an opening in the bearing.

In some embodiments, the first stopper position of the stopper may include an engaged position and the second stopper position of the stopper may include a disengaged position.

In some embodiments, the headrest support plate may be coupled to a portion of a headrest slide sub-assembly, the headrest slide sub-assembly configured to translate the headrest support plate between at least a first headrest position and a second headrest position.

In some embodiments, the cavity within the base may be defined by one or more walls of the base, the base configured to couple the headrest support plate to a portion of a seatback of a seat.

In some embodiments, the base may further include a u-shaped slot positioned proximate to the cavity of the base, the u-shaped slot configured to at least partially surround a portion of the lever portion of the plunger.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-6 in general illustrate a quick release headrest removal assembly for an aircraft seat, in accordance with one or more embodiments of the disclosure.

Seats may include headrest assemblies including one or more headrest components. The headrest assembly and/or one or more components of the headrest assembly may be subject to increased wear (e.g., stress, strain, for dirt or other mess such as airsickness, contraband, or the like resulting in damage of headrest assembly).

After a period of time and/or a particular type of wear factor occurring, headrest assembly and/or one or more components of the headrest assembly may need to be accessed and/or remove after the headrest assembly is installed for maintenance, cleaning, and/or replacement. For example, a headrest slide mechanism of the headrest assembly may need to be accessed after the headrest assembly has been installed to perform routine maintenance on the headrest slide mechanism or to repair one or more components of the headrest slide mechanism in the event one or more components are inoperable (or become damaged). By way of another example, the headrest dress cover and/or cushion may need to be accessed to perform routine maintenance (such as routine cleaning services) on such components. Removing and re-installing the headrest assembly (and/or one or more components of the assembly) may require a method that is quick, inexpensive, and low-labor. For example, the assembly should be quickly dismantled and put together without incurring considerable labor costs or without requiring tools.

In addition, in select industries the build of the seat (and any included components within the build) may be required to meet guidelines and/or standards. For example, aircraft seats may be required to meet aviation guidelines and/or standards. For instance, the select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

As such, it would be desirable to provide a quick release headrest assembly. The quick release headrest assembly should allow for enhanced access to a headrest slide mechanism and maintenance thereof. The quick release headrest assembly should allow for maintenance of the headrest dress cover and/or headrest cushion. The quick release headrest assembly should allow the headrest to be quickly removed without tools to reduce associated maintenance times. The quick release headrest assembly should be configured in accordance with aviation guidelines and/or standards.

Figure 1A:
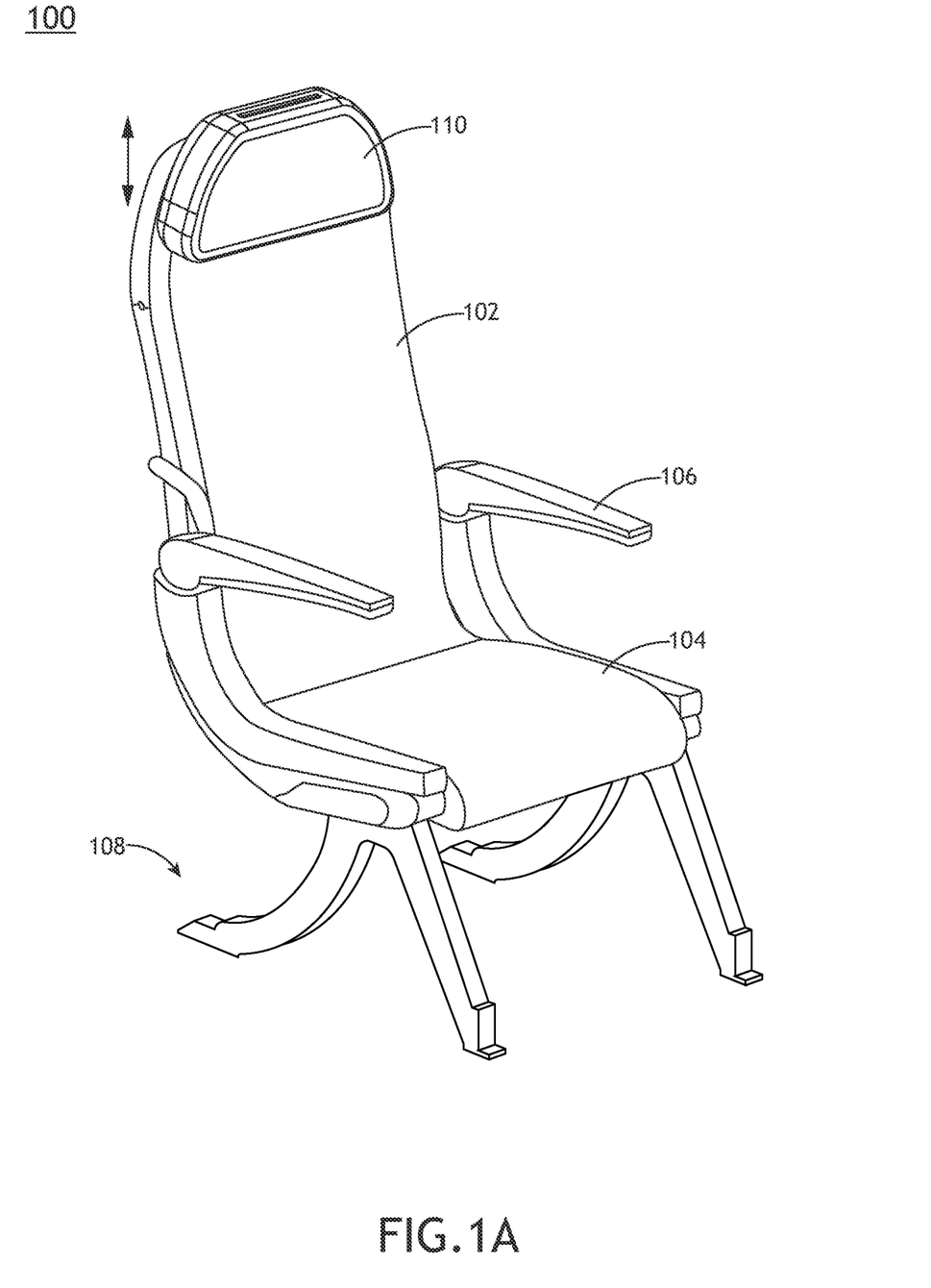
FIG. 1A illustrates a perspective view of an aircraft seat including a headrest assembly in a stowed positioned, in accordance with one or more embodiments of the disclosure.
Figure 1B:
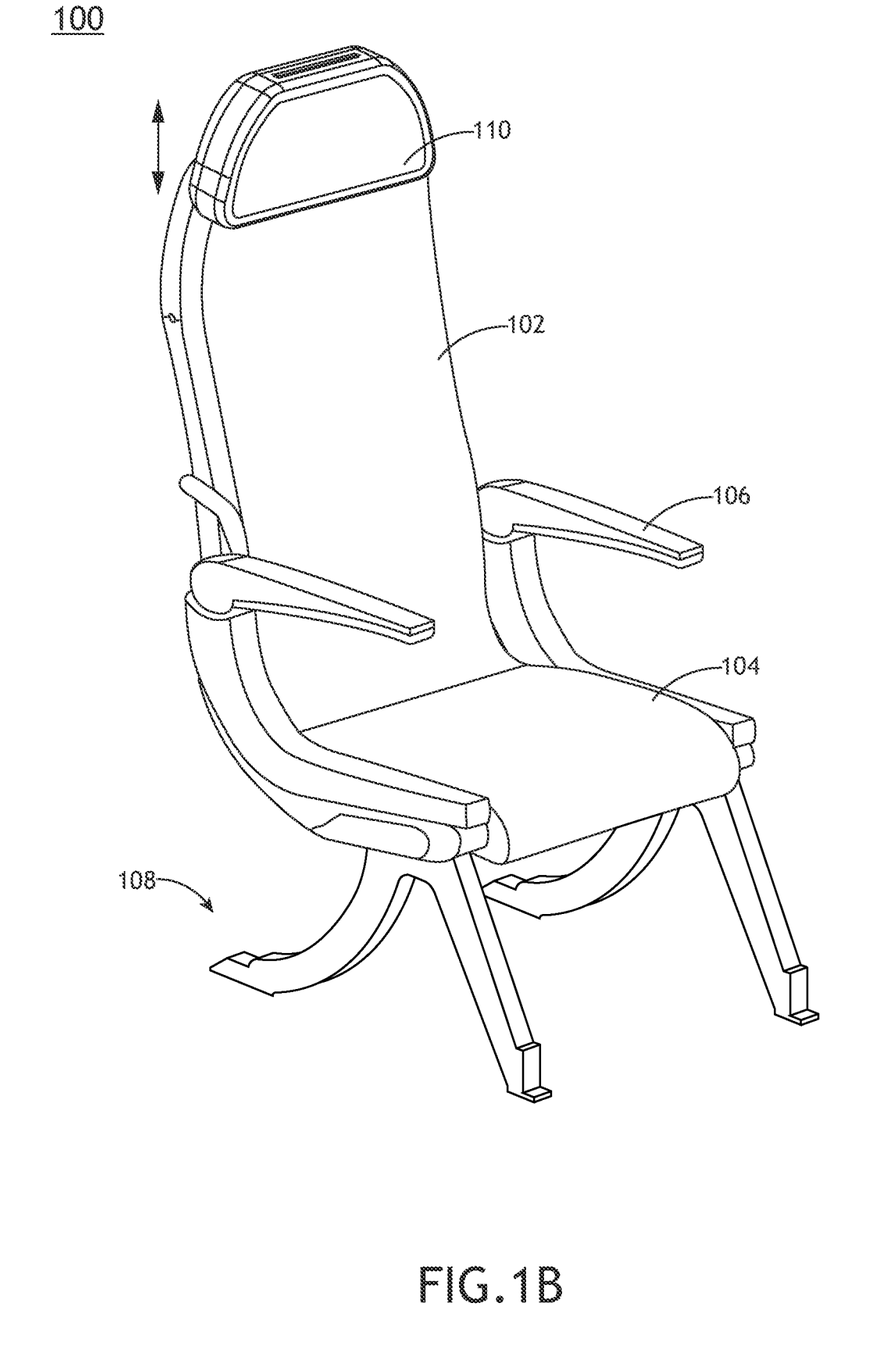
FIG. 1B illustrates a perspective view of an aircraft seat including a headrest assembly in a deployed position, in accordance with one or more embodiments of the disclosure.

Referring in general to FIGS. 1A-1B, a quick release headrest assembly may be integrated within an aircraft seat 100 installed within an aircraft cabin. For example, the aircraft seat 100 may include, but is not limited to, a business class or first-class passenger seat, an economy-class passenger seat, a crew member seat, or the like. It is noted the terms "aircraft seats" and "passenger seats" may be considered equivalent, for purposes of the disclosure.

The aircraft seat 100 may be rotatable about an axis (e.g., swivelable). The aircraft seat 100 may be fully positionable between the outer limits of motion as defined by the moveable components of the aircraft seat 100. Where the aircraft seat 100 is installed within a passenger compartment, the aircraft seat 100 may be fully positionable between the outer limits of motion as defined by one or more passenger compartment monuments of the passenger compartment. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 100 may be actuatable (e.g., translatable and/or rotatable) from the TTL position to a non-TTL position, and/or vice versa. Further, it is noted the aircraft seat 100 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

In general, an aircraft seat 100 may be translatable (e.g., trackable or slidable). The aircraft seat 100 may be rotatable about an axis cross-wise through the aircraft seat 100 into a position including, but not limited to, the upright or raised position, one or more lounge or reclined positions, and a lie-flat or bed position. For example, the aircraft seat 100 may transition directly between the upright or raised position and the lie-flat or bed position. By way of another example, it is noted the aircraft seat 100 may transition through one or more lounge or reclined positions between the upright or raised position and the lie-flat or bed position. By way of another example, the aircraft seat 100 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 100 may include a seatback 102, a seat pan 104, and one or more arms 106. The aircraft seat 100 may be coupled to a base 108 couplable to a floor of an aircraft cabin.

Referring generally to FIG. 1, the seatback 102 may include a headrest assembly 110. For example, the headrest assembly 110 may be a separate component coupled to (or inserted into) the seatback 102. For instance, the headrest assembly 110 may be movable relative to the seatback frame of the aircraft seat 100 (e.g., adjustable, removable, or the like).

Figure 2A:
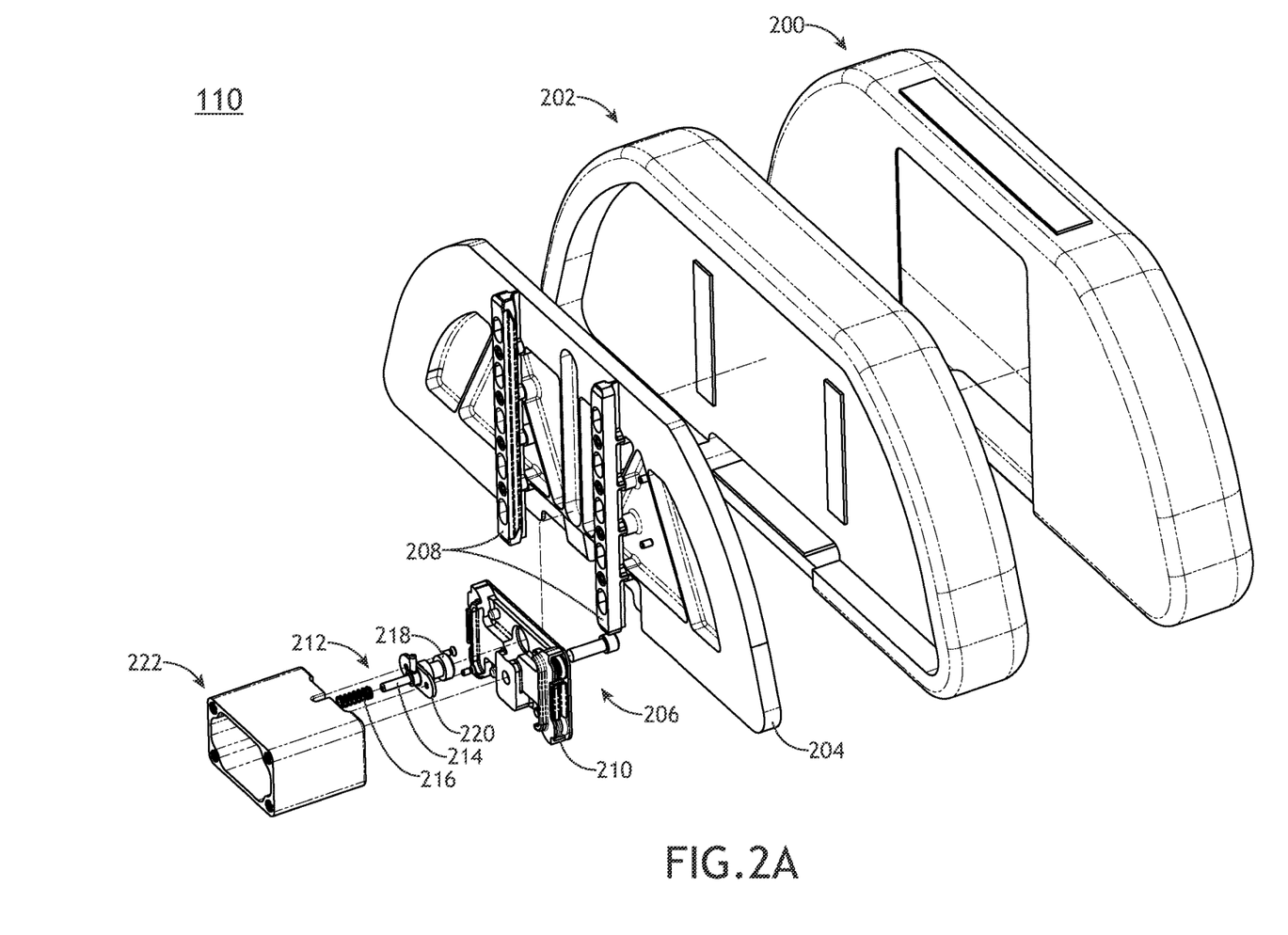
FIG. 2A illustrates an exploded view of the headrest assembly, in accordance with one or more embodiments of the disclosure.
Figure 2B:
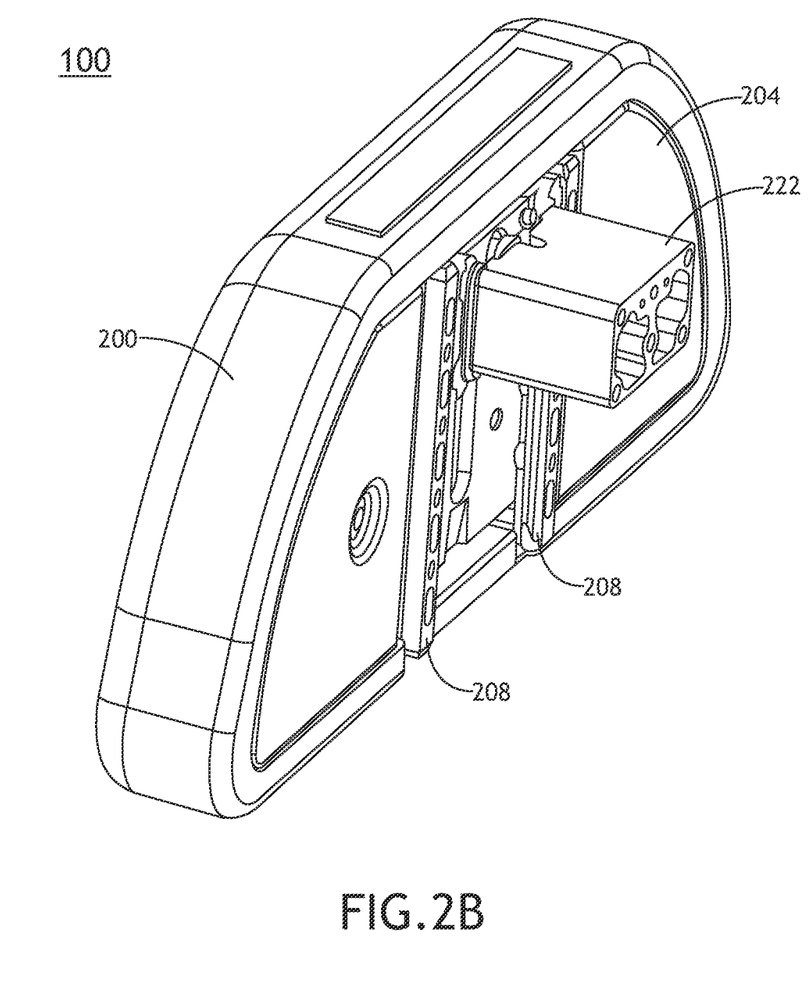
FIG. 2B illustrates a rear perspective view of the headrest assembly, in accordance with one or more embodiments of the disclosure.
Figure 2C:
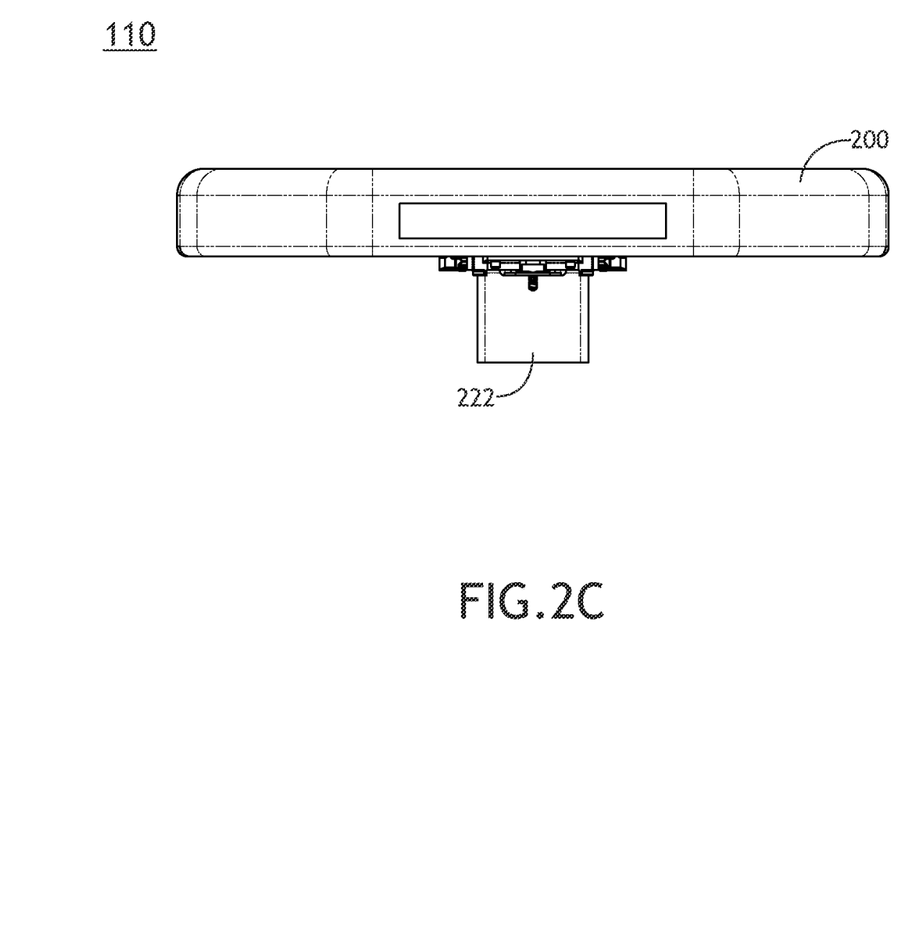
FIG. 2C illustrates a top view of the headrest assembly, in accordance with one or more embodiments of the disclosure.
Figure 2D:
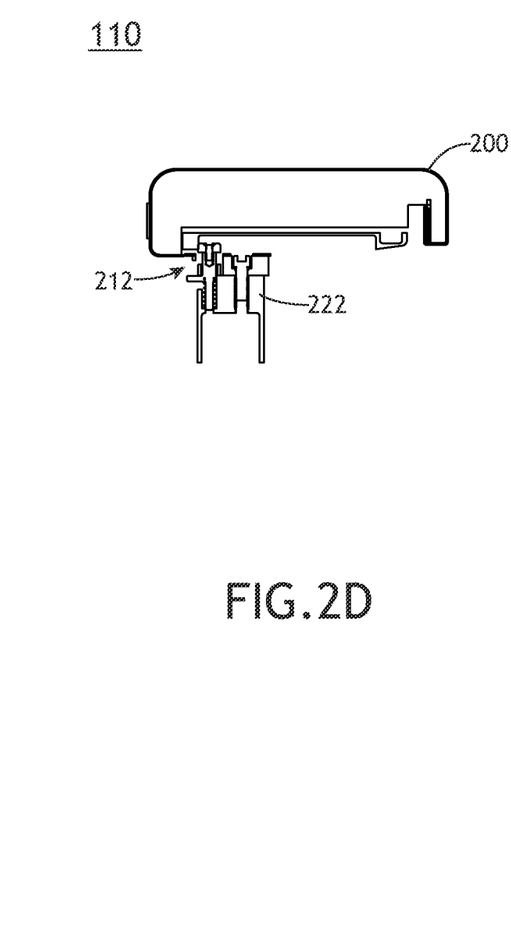
FIG. 2D illustrates a cross-sectional view of the headrest assembly, in accordance with one or more embodiments of the disclosure.
Figure 2E:
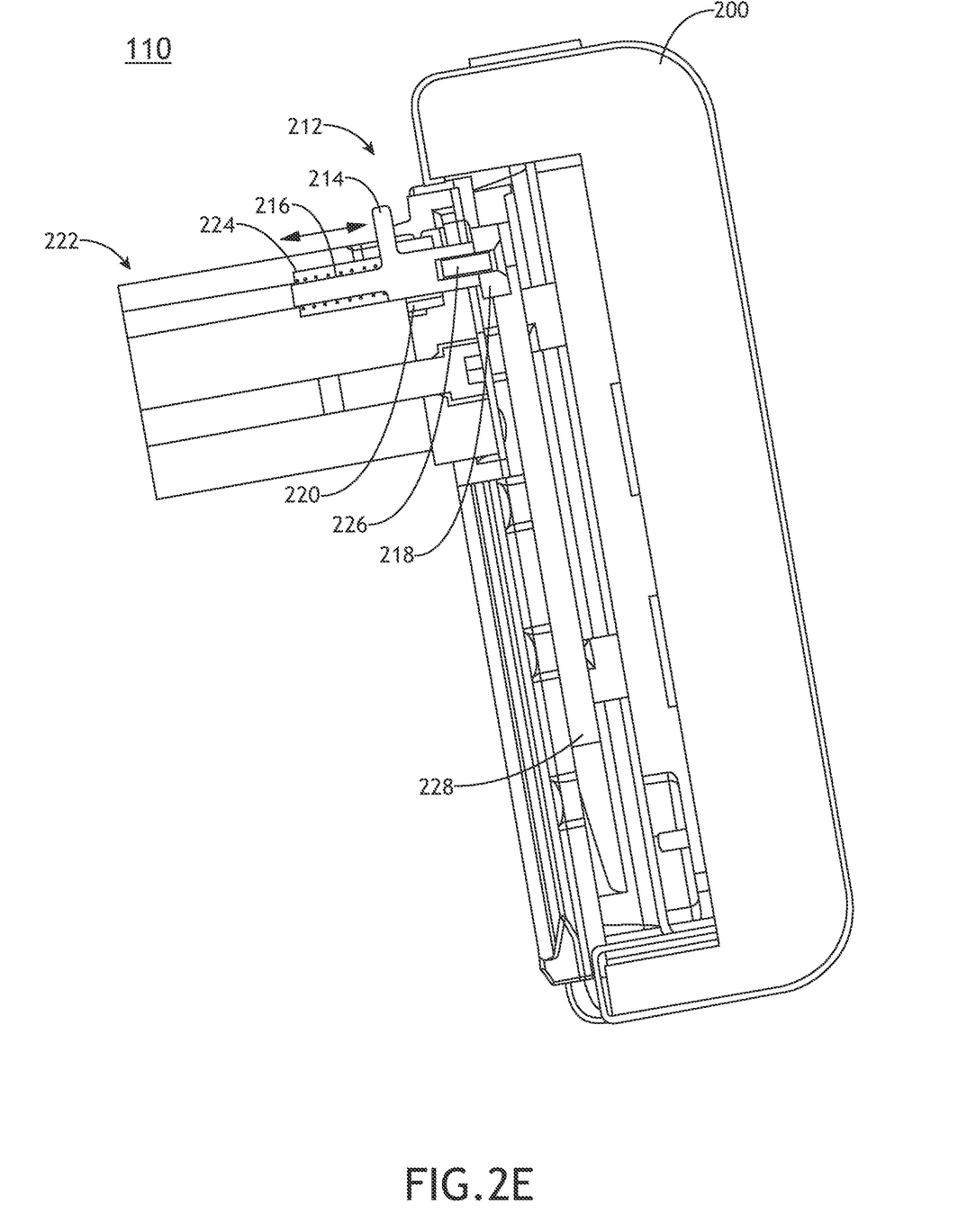
FIG. 2E illustrates a cross-sectional view of the headrest assembly, in accordance with one or more embodiments of the disclosure.
Figure 2F:
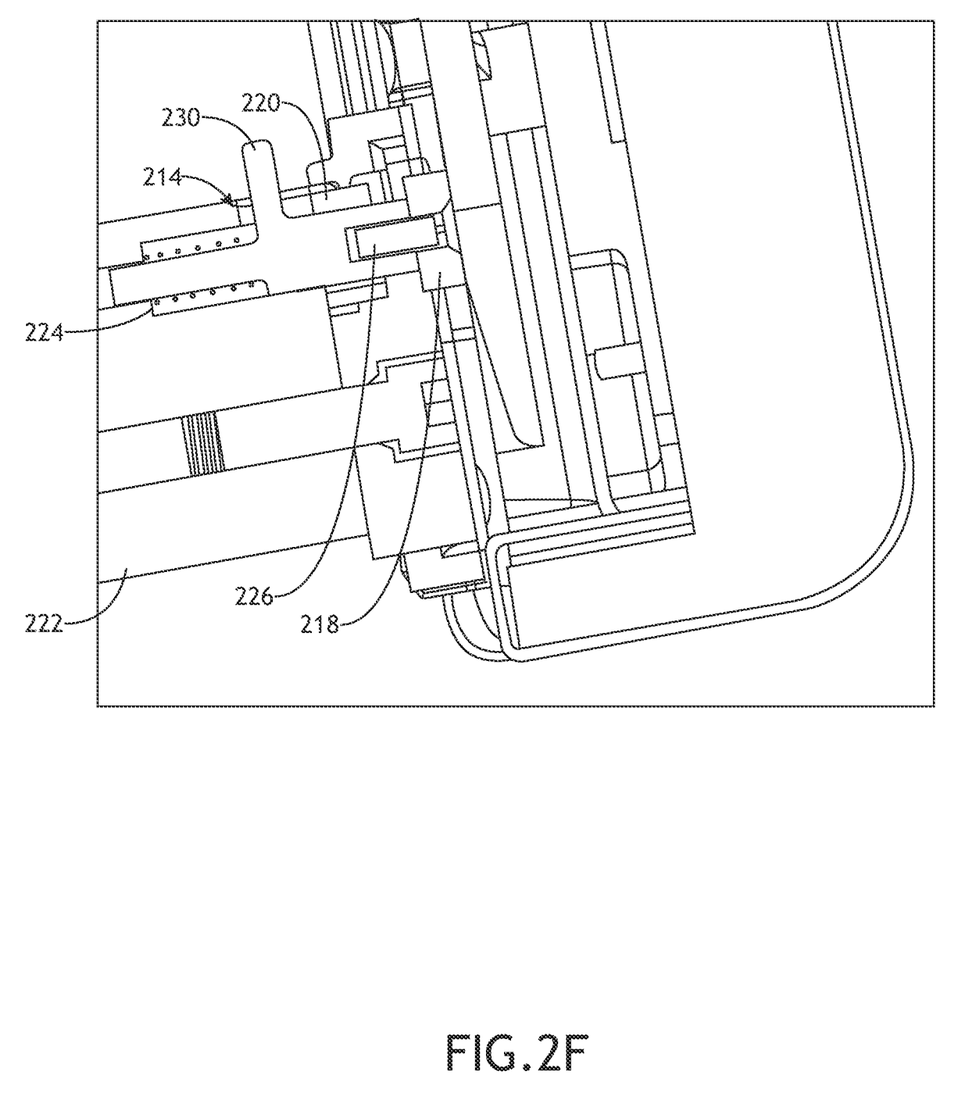
FIG. 2F illustrates a detailed cross-sectional view of the headrest assembly, in accordance with one or more embodiments of the disclosure.
Figure 2G:
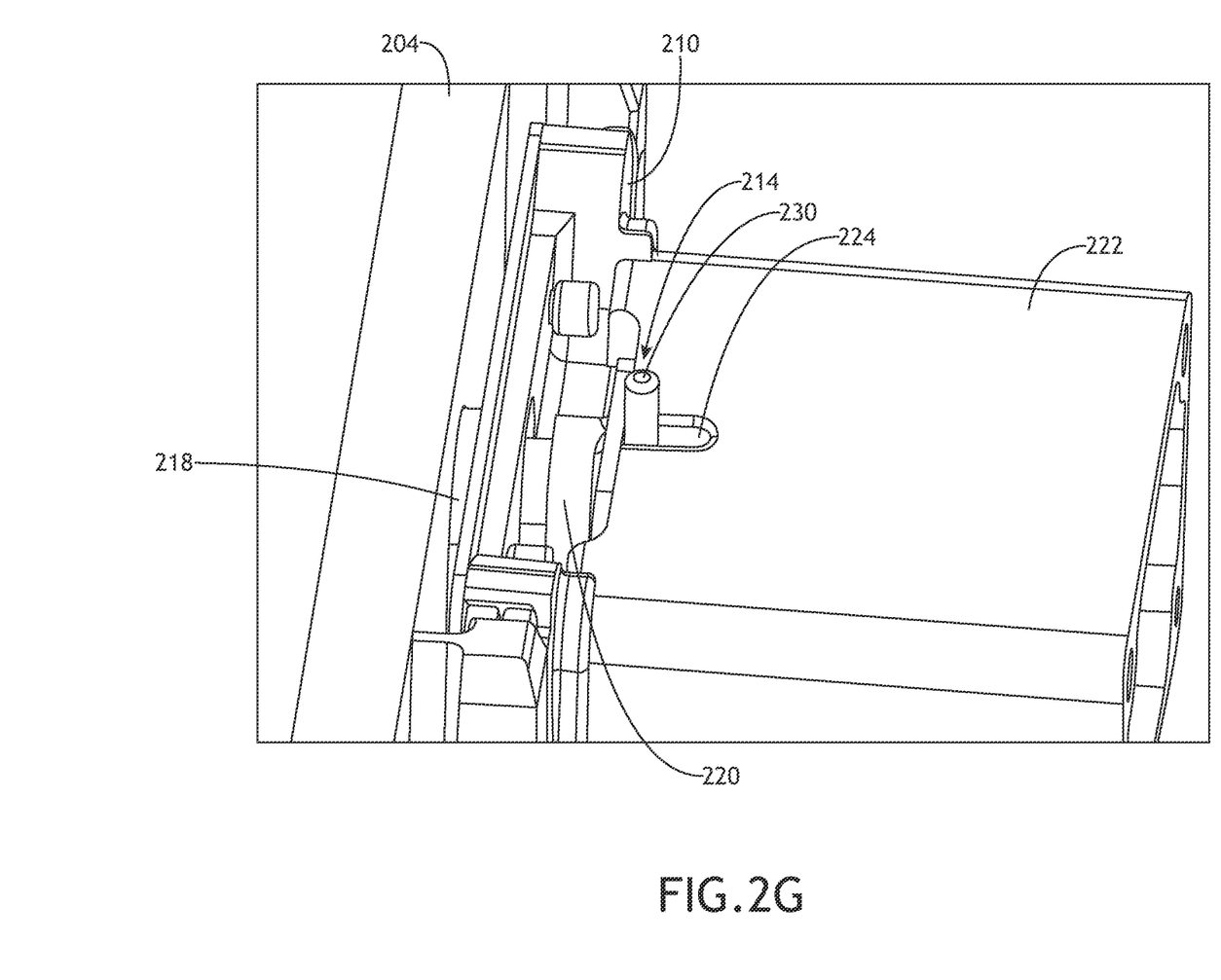
FIG. 2G illustrates a detailed view of the headrest assembly, in accordance with one or more embodiments of the disclosure.
Figure 2H:
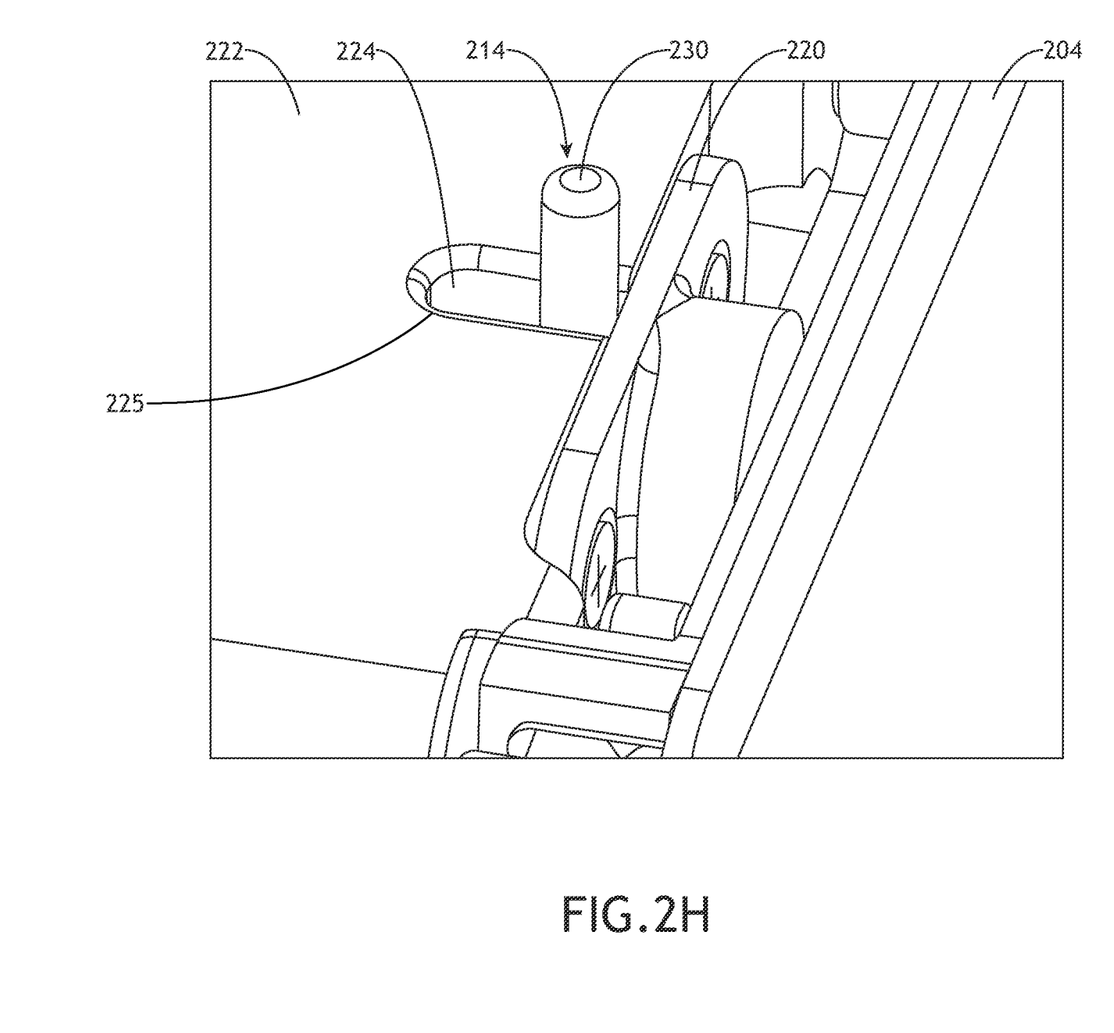
FIG. 2H illustrates a detailed view of the headrest assembly, in accordance with one or more embodiments of the disclosure.
Figure 3:
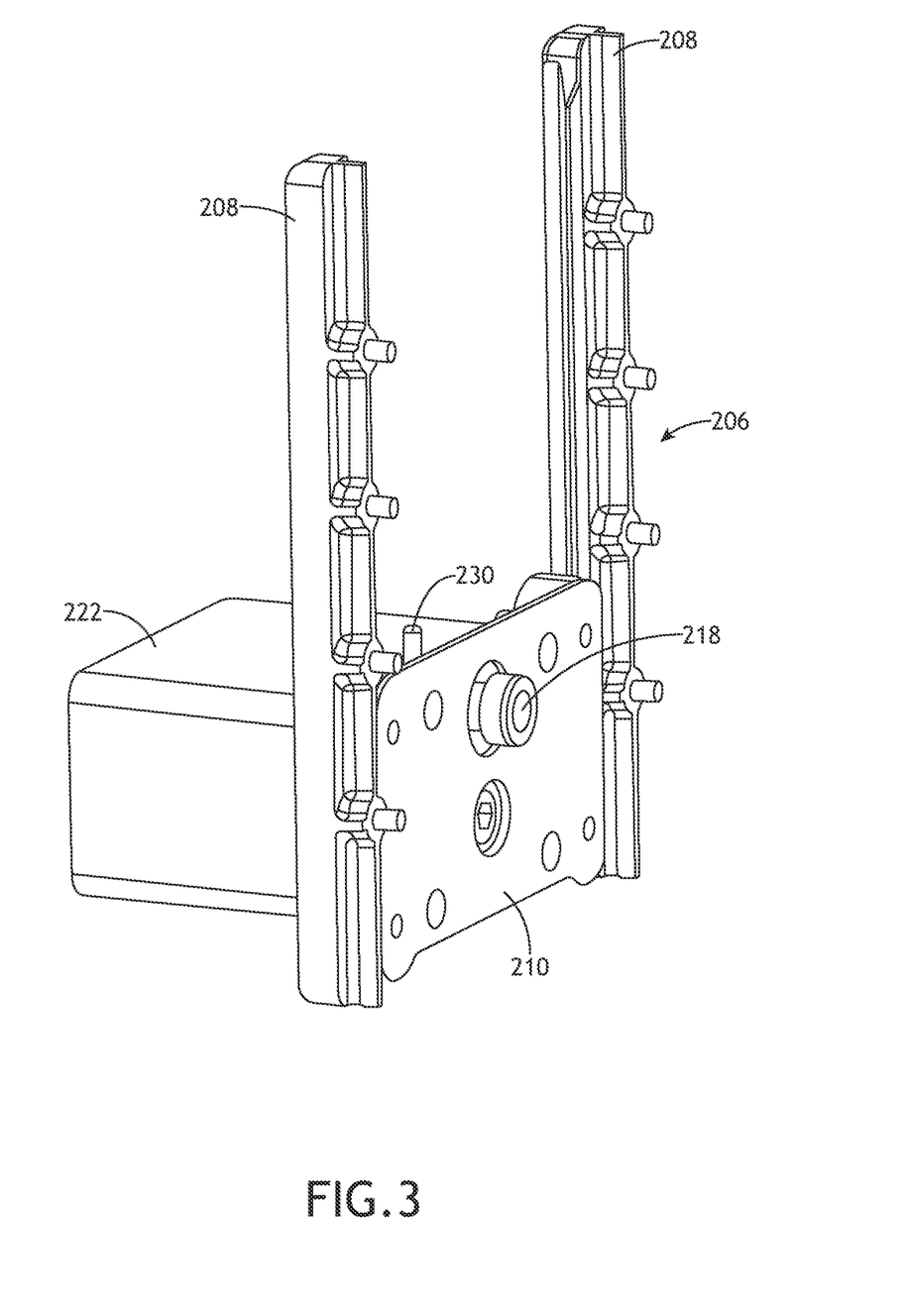
FIG. 3 illustrates a front perspective view of a slide sub-assembly and quick release headrest removal sub-assembly of the headrest assembly, in accordance with one or more embodiments of the disclosure.

FIGS. 2A-2H illustrate the headrest assembly 110, in accordance with one or more embodiments of the disclosure. In particular, FIG. 2A depicts an exploded view of the headrest assembly 110, in accordance with one or more embodiments of the disclosure. In particular, FIG. 2B depicts a rear perspective view of the headrest assembly, in accordance with one or more embodiments of the disclosure. In particular, FIG. 2C depicts a top view of the headrest assembly, in accordance with one or more embodiments of the disclosure. In particular, FIGS. 2D-2E depict cross-sectional views of the headrest assembly, in accordance with one or more embodiments of the disclosure. In particular, FIG. 2F depicts a detailed cross-sectional view of the headrest assembly, in accordance with one or more embodiments of the disclosure. In particular, FIGS. 2G-2H depict detailed views of the headrest assembly, in accordance with one or more embodiments of the disclosure.

Referring to FIG. 2A, the headrest assembly 110 may include a headrest dress cover 200. The headrest assembly 110 may include a headrest cushion 202 configured to conform or substantially conform to a headrest support plate 204. The dress cover 200 may be configured to fit over at least a portion of the cushion 202. For example, the dress cover 200 may be configured to wrap around or otherwise enclose exterior surfaces of the cushion 202. The headrest cover 200 may be configured to attach to the support plate 204 and/or the cushion 202. Although FIG. 2A depicts the dress cover 200 and the cushion 202 as separate components, it is noted that the dress cover 200 and the cushion 202 may be integrated to form a single component.

The headrest assembly 110 may include a headrest slide sub-assembly 206 couplable to one or more portions of the headrest support plate 204. The headrest slide sub-assembly 206 may be configured to transition the support plate 204 (including the cushion and/or dress cover) between one or more positions. For example, the headrest slide sub-assembly 206 may be configured to linearly slide the support plate 204 relative to the seatback 102 of the aircraft seat 100 to transition the headrest assembly 110 between the one or more positions. In one instance, as shown in FIG. 1A, the headrest assembly 110 may be in a stowed position during TTL phases of flight. In another instance, as shown in FIG. 1B, the headrest assembly 110 may be in a deployed position during non-TTL phases of flight. It is noted the headrest assembly 110 may also be configured for one or more intermediate positions. For example, the headrest assembly 110 may be in a particular intermediate position during transition between the stowed position and the deployed position.

The headrest slide sub-assembly 206 may include a rail and carriage sub-assembly including one or more linear rails 208 and a carriage slider 210. The rail and carriage sub-assembly may be couplable to one or more portions of the support plate 204. For example, a first rail 208 may be couplable to a first portion of the support plate 204 and an additional rail 208 may be couplable to an additional portion of the support plate. For instance, a first portion of the carriage slider 210 may be couplable to the first rail 208 and an additional portion of the carriage may be couplable to the additional rail 208.

The one or more linear rails 208 may include one or more surfaces that form a channel. For example, the channel may be configured to receive a portion of the carriage slider 210. The carriage slider 210 may be configured to be axially displaceable with the channel of the one or more linear rails 208. For example, the carriage slider 210 may be axially displaceable within the first rail 208 and the additional rail 208 when the carriage slider 210 is coupled to the one or more linear rails 208.

The headrest assembly 110 may include a quick release headrest removal sub-assembly 212. It is noted that the terms "quick release headrest removal sub-assembly", "headrest removal sub-assembly", "sub-assembly", and variants thereof may be considered equivalent unless otherwise noted herein. The quick release headrest removal sub-assembly 212 may include, but is not limited to, a retractable plunger 214, a compressible spring 216, a stopper 218, and a bearing 220.

The headrest assembly 110 may include a base 222 couplable to a portion of the seatback 102. The base 222 may include a cavity 224 (e.g., bore housing) defined by one or more walls of the base 222. The cavity 224 may be configured to house one or more components of the quick release headrest removal sub-assembly 212. For example, the cavity 224 may be configured to house at least a portion of the plunger 214 and the compressible spring 216. For instance, the cavity 224 may be configured to house a distal end of the plunger 214 including the compressible spring 216.

The base 222 may include a slot 225 configured to at least partially surround a lever portion 230 (or tab portion 230) of the plunger 214, as discussed further herein. It is noted that the slot 225 may be shaped to complement the shape of lever 230. For example, the slot 225 may include a U-shaped slot 225 to complement the shape of the lever 230 of the plunger 214, such that the U-shaped slot 225 may prevent the lever 230 and/or the plunger 214 from rotating within the cavity 224, such that a user may translate the plunger 214 within the cavity 224.

The plunger 214 may be configured to couple to the stopper 218 via one or more fasteners 226. For example, a proximal end of the plunger 214 may be configured to couple to the stopper 218. The stopper 218 may be configured to stop travel and prevent the support plate 204 from detaching from the slide sub-assembly 206. For example, the stopper 218 may be configured to translate within a cavity 228 within the support plate 204.

The retractable plunger 214 may include a lever portion 230 (or tab portion 230) configured to translate the retractable plunger 214 in a horizontal direction within the cavity 224 upon an application of force. For example, upon an application of force, the retractable plunger 214 may be configured to translate the stopper 218 in a horizontal direction to disengage the stopper 218 from the support plate 204, such that the support plate 204 (including the cushion and/or dress cover) may be removed. In this regard, when the support plate 204 (including the cushion and/or dress cover) is disengaged, one or more components of the headrest assembly 110 may be cleaned/serviced. In one instance, the headrest dress cover 200 and/or headrest cushion 202 may be laundered once the support plate 204 is removed. It is noted that removal of the support plate 204 may be quick, inexpensive, low-labor and tool-less, such that associated maintenance times may be reduced.

Further, once the support plate 204 has been removed, as previously discussed herein, one or more components of the slide sub-assembly 206 may be serviceable. For example, the one or more linear rails 208 may be serviced once the support plate 204 has been removed. By way of another example, the carriage slider 210 may be serviced once the support plate 204 has been removed.

The bearing 220 may be configured to allow the plunger 214 to move freely within the assembly 110. For example, the bearing 220 may be couplable to a portion of the base 222 and positioned adjacent to the shaft of the plunger 214. Further, the bearing 220 may be configured to provide support for the plunger 214 when the plunger 214 is translating the horizontal direction. For example, the bearing 220 may be formed of a durable lubricated material (e.g., plastic, or the like) to allow the plunger to move freely and provide support during translation. It is noted that the bearing 220 may include any type of bearing including, but not limited to, a sleeve bearing.

Figure 4:
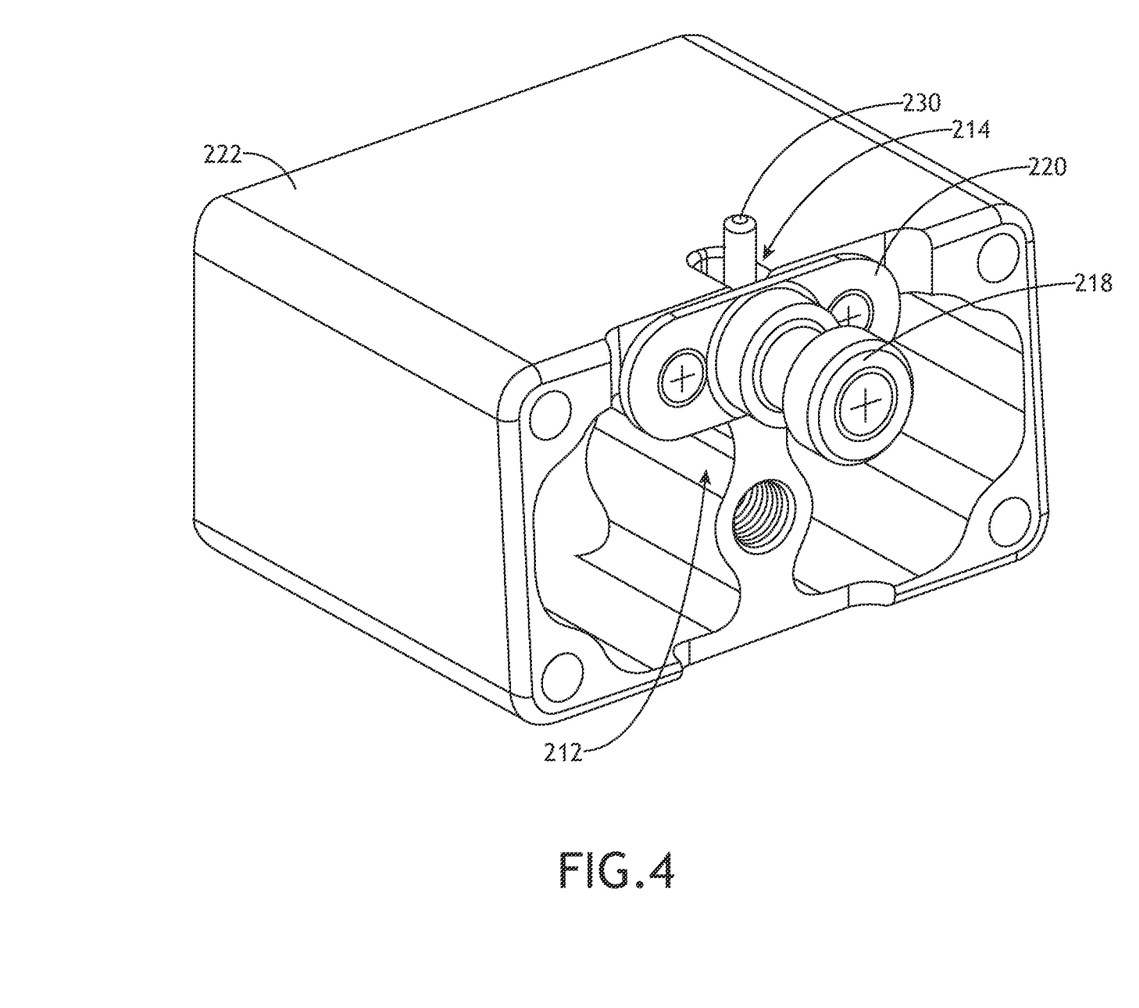
FIG. 4 illustrates a front perspective view of the quick release headrest removal sub-assembly of the headrest assembly, in accordance with one or more embodiments of the disclosure.
Figure 5:
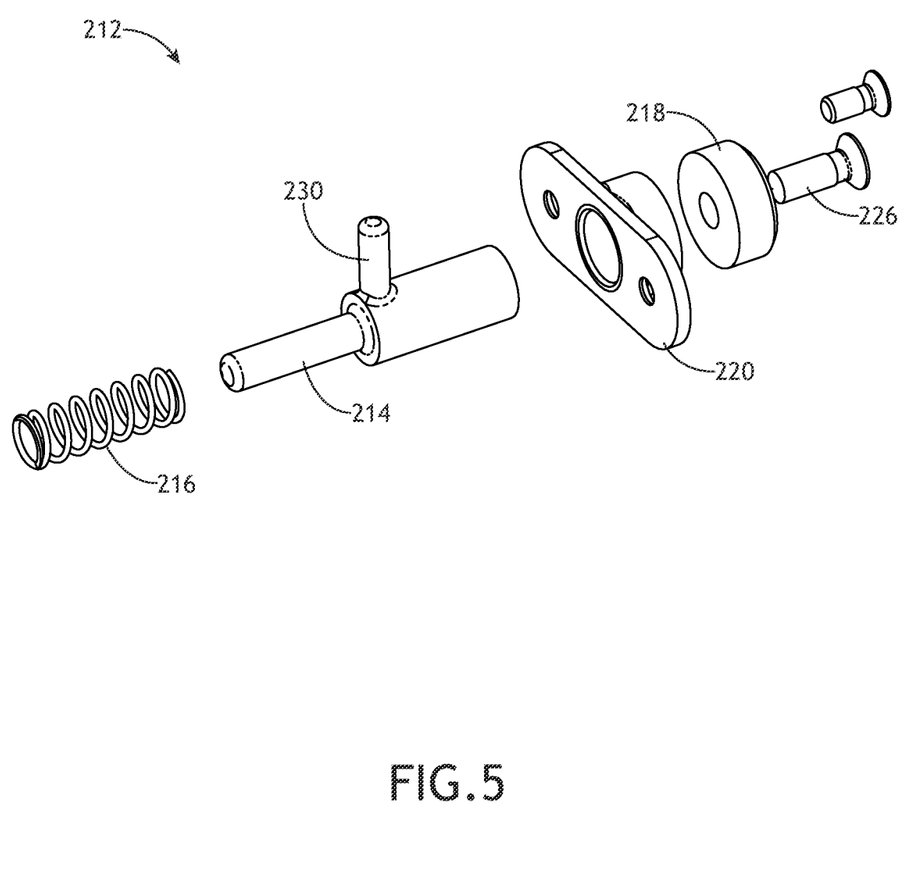
FIG. 5 illustrates an exploded view of the quick release headrest removal sub-assembly, in accordance with one or more embodiments of the disclosure.

Referring to FIGS. 4-5, the slide sub-assembly 206 may be un-coupled from the base 222, and thereafter the bearing 220 may be un-coupled from the base 222, such that one or more components of the removal sub-assembly 212 or the base 222 may be serviced. For example, the slide sub-assembly 206 may be un-coupled from the base 222 by removing one or more fasteners and thereafter the bearing 220 may be un-coupled from the base 222 by removing one or more fasteners coupled to the base 222, such that the base 222, the plunger 214 and compressible spring 216 positioned within the cavity 224 may be easily accessed. In this regard, the bearing 220 may be un-coupled from the base 222 to service (e.g., replace, repair, clean, or the like) the compressible spring 216. Further, the bearing 220 may be un-coupled from the base 222 to service the bearing 220 (e.g., replace, repair, clean, or the like). As such, the one or more components of removal sub-assembly 212 may be serviceable components, such that the removal sub-assembly 212 may be a serviceable unit (e.g., the whole sub-assembly 212 does not need to be replaced).

Figure 6:
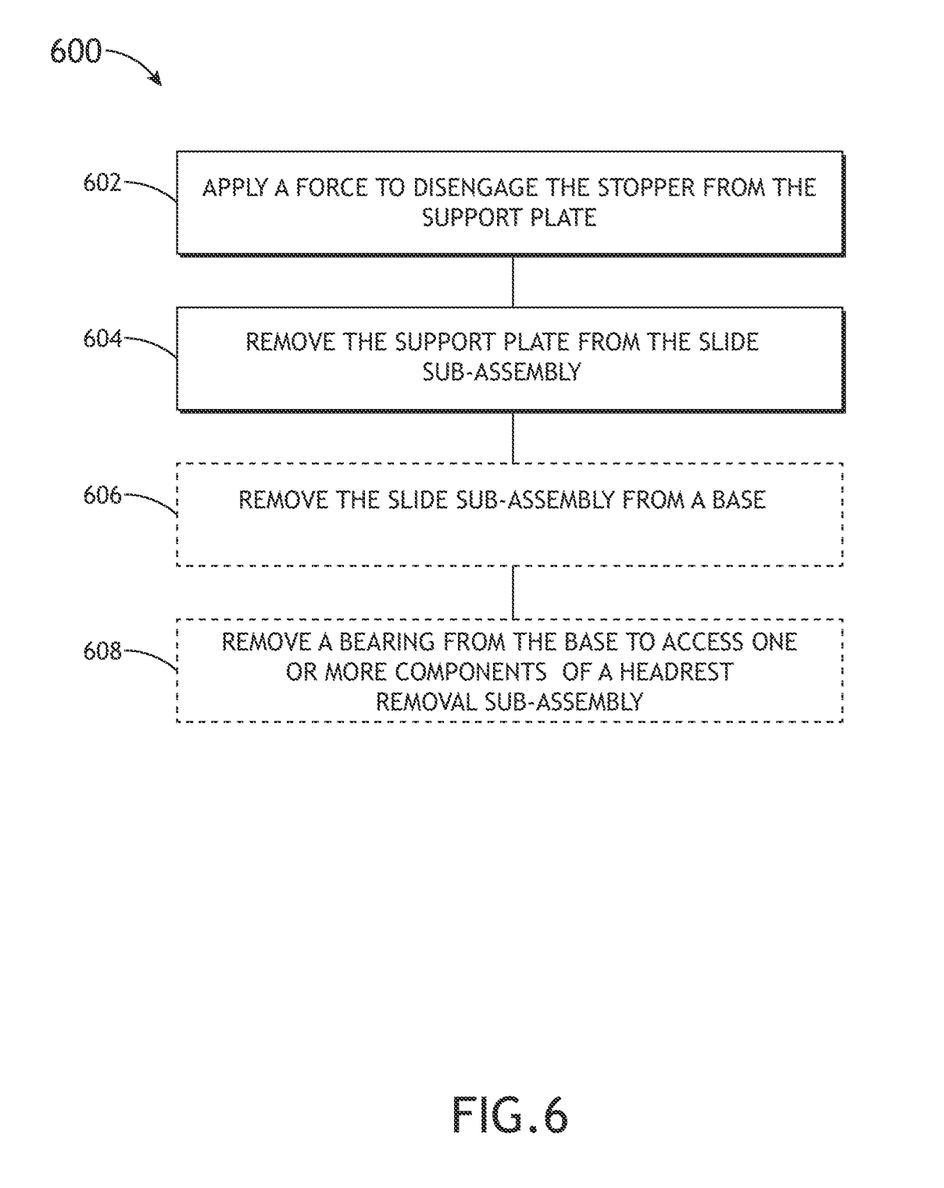
FIG. 6 illustrates a flowchart depicting a method or process for disassembling the headrest assembly, in accordance with one or more embodiments of the disclosure.

Disassembling the headrest assembly 110 may include one or more of the following steps of the method or process 600:

In a step 602, a force may be applied to disengage the stopper 218 from the support plate 204. For example, the force may be applied through an application of force on the plunger 214 in a specific direction, the specific direction not being one accomplished when sitting in the aircraft seat 100. For instance, the direction may be along the x-axis (e.g., horizontal axis) to cause the stopper 218 to move in the horizontal direction, which then causes the stopper 218 to disengage from the support plate 204. In this regard, the force may cause the compressible spring 216 surrounding a distal end of the plunger 214 to compress within the cavity 224 to cause the stopper 218 to translate and disengage from the support plate 204.

In a step 604, the support plate 204 may be removed from the slide sub-assembly 206. For example, on the stopper 218 has been disengaged from the support plate 204, the support plate 204 may be removed from the slide sub-assembly 206.

Once the support plate 204 has been removed from the slide sub-assembly, one or more components of the headrest assembly 110 may be serviced or maintained. For example, the headrest dress cover 200 and/or headrest cushion 202 may be laundered once the support plate 204 has been removed. By way of another example, the one or more linear rails 208 of the slide sub-assembly 206 may be serviced once the support plate 204 has been removed. By way of another example, the carriage slider 210 of the slide sub-assembly 206 may be serviced once the support plate 204 has been removed.

In an optional step 606, the slide sub-assembly 206 may be removed from the base 222. For example, the slide sub-assembly 206 may be un-coupled from the base 222 by removing one or more fasteners. For instance, the slide sub-assembly 206 may be un-coupled from the base 222 to service one or more components of the slide sub-assembly 206 and/or one or more components of the removal sub-assembly 212.

In an optional step 608, the bearing 220 may be removed from the base 222. For example, the bearing 220 may be un-coupled from the base 222 by removing one or more fasteners coupled to the base 222, such that the base 222, the plunger 214 and compressible spring 216 positioned within the cavity 224 may be easily accessed. In this regard, the bearing 220 may be un-coupled from the base 222 to service (e.g., replace, repair, clean, or the like) the compressible spring 216. Further, the bearing 220 may be un-coupled from the base 222 to service the bearing 220 (e.g., replace, repair, clean, or the like).

It is noted the method or process 600 is not limited to the steps and/or sub-steps provided. The method or process 600 may include more or fewer steps and/or sub-steps. In addition, the method or process 600 may perform the steps and/or sub-steps simultaneously. Further, the method or process 600 may perform the steps and/or sub-steps sequentially, including in the order provided or an order other than provided. Therefore, the above description should not be interpreted as a limitation on the scope of the disclosure but merely an illustration.

Although embodiments of the disclosure illustrate coupling or uncoupling various components of the headrest assembly 110 in a specific direction, it is noted various components of the headrest assembly 110 may be coupled or uncoupled from one or more additional directions with enough applied force. Therefore, the above description should not be interpreted as a limitation on the scope of the disclosure but merely an illustration.

It is noted the headrest assembly 110 (and/or one or more components of the headrest assembly 110) may be configured to work with any aircraft seat 100 and/or any set of components in the aircraft seat 100. For example, the headrest assembly 110 (and/or one or more components of the headrest assembly 110) may be configured to take into account any changes in shape of the components of the aircraft seat 100 (e.g., within an x-y plane forming a seating surface for an occupant), where the changes in shape may be caused by or otherwise dependent on the location of the aircraft seat 100 within the aircraft cabin.

Although embodiments of the disclosure illustrate the headrest assembly 110 being integrated within the aircraft seat 100, it is noted, however, that the headrest assembly 110 and/or components of the headrest assembly 110 are not limited to the aviation environment and/or the aircraft components within the aviation environment. For example, the headrest assembly 110 and/or components of the headrest assembly 110 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the headrest assembly 110 and/or components of the headrest assembly 110 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A headrest assembly, the headrest assembly comprising:
    a headrest support plate;
    a headrest slide sub-assembly configured to couple to one or more portions of the headrest support plate, the headrest slide sub-assembly configured to translate the headrest support plate between at least a first headrest position and a second headrest position;
    a base configured to couple the headrest assembly to a portion of a seatback of a seat, the base including a cavity defined by one or more walls of the base; and
    a headrest removal sub-assembly, the headrest removal sub-assembly comprising:
        a plunger including a plunger shaft, the plunger shaft including a first end and a second end, the plunger including a lever portion positioned between the first end and the second end of the plunger shaft, the cavity configured to house at least a portion of the plunger shaft;
        a compressible spring coupled to the second end of the plunger shaft and configured to surround at least a portion of the plunger shaft, the cavity configured to house at least a portion of the compressible spring; and
        a stopper configured to couple to the first end of the plunger shaft, the stopper configured to engage with a cavity within the headrest support plate,
    the plunger configured to translate the stopper between at least a first stopper position and a second stopper position when a force is applied to the lever portion of the plunger to cause the plunger to compress a portion of the compressible spring within the cavity of the base to cause the stopper to disengage from the cavity within the headrest support plate to cause the headrest removal sub-assembly to disengage from the headrest support plate.

2. The assembly of claim 1, wherein the headrest removal sub-assembly further comprises:

a bearing positioned proximate to the first end of the plunger shaft, at least a portion of the plunger shaft configured to translate within an opening in the bearing.

3. The assembly of claim 1, wherein the first stopper position of the stopper includes an engaged position, wherein the second stopper position of the stopper includes a disengaged position.

4. The assembly of claim 1, further comprising:
a headrest cushion configured to at least substantially conform to the headrest support plate, the headrest cushion configured to attach to at least a portion of the headrest support plate; and
a headrest dress cover configured to fit over at least a portion of the headrest cushion.

5. The assembly of claim 1, wherein the first headrest position of the headrest support plate includes a stowed position.

6. The assembly of claim 1, wherein the second headrest position of the headrest support plate includes a deployed position.

7. The assembly of claim 1, wherein the headrest slide sub-assembly includes a rail and carriage sub-assembly.

8. The assembly of claim 7, wherein the rail and carriage sub-assembly comprises:
one or more linear rails configured to couple to one or more portions of the headrest support plate; and
a carriage slider configured to be axially displaceable within a channel of the one or more linear rails.

9. The assembly of claim 1, wherein the base further comprises:
a u-shaped slot positioned proximate to the cavity of the base, the u-shaped slot configured to at least partially surround a portion of the lever portion of the plunger.

10. A headrest removal assembly, the headrest removal assembly comprising:
a plunger including a plunger shaft, the plunger shaft including a first end and a second end, the plunger including a lever portion positioned between the first end and the second end of the plunger shaft, a cavity within a base configured to house at least a portion of the plunger shaft;
a compressible spring coupled to the second end of the plunger shaft and configured to surround at least a portion of the plunger shaft, the cavity configured to house at least a portion of the compressible spring; and
a stopper configured to couple to the first end of the plunger shaft, the stopper configured to engage with a cavity within a headrest support plate,
the plunger configured to translate the stopper between at least a first stopper position and a second stopper position when a force is applied to the lever portion of the plunger to cause the plunger to compress a portion of the compressible spring within the cavity of the base to cause the stopper to disengage from the cavity within the headrest support plate to cause the headrest removal assembly to disengage from the headrest support plate.

11. The assembly of claim 10, further comprising:
a bearing positioned proximate to the first end of the plunger shaft, at least a portion of the plunger shaft configured to translate within an opening in the bearing.

12. The assembly of claim 10, wherein the first stopper position of the stopper includes an engaged position, wherein the second stopper position of the stopper includes a disengaged position.

13. The assembly of claim 10, wherein the headrest support plate is coupled to a portion of a headrest slide sub-assembly, the headrest slide sub-assembly configured to translate the headrest support plate between at least a first headrest position and a second headrest position.

14. The assembly of claim 13, wherein the cavity within the base is defined by one or more walls of the base, the base configured to couple the headrest support plate to a portion of a seatback of a seat.

15. The assembly of claim 10, wherein the base further comprises:
a u-shaped slot positioned proximate to the cavity of the base, the u-shaped slot configured to at least partially surround a portion of the lever portion of the plunger.

* * * * *